Aug. 17, 1926.
H. M. SHEER
1,596,771
THERMOSTATIC SELF REGULATING VALVE
Filed March 16, 1925     2 Sheets-Sheet 1
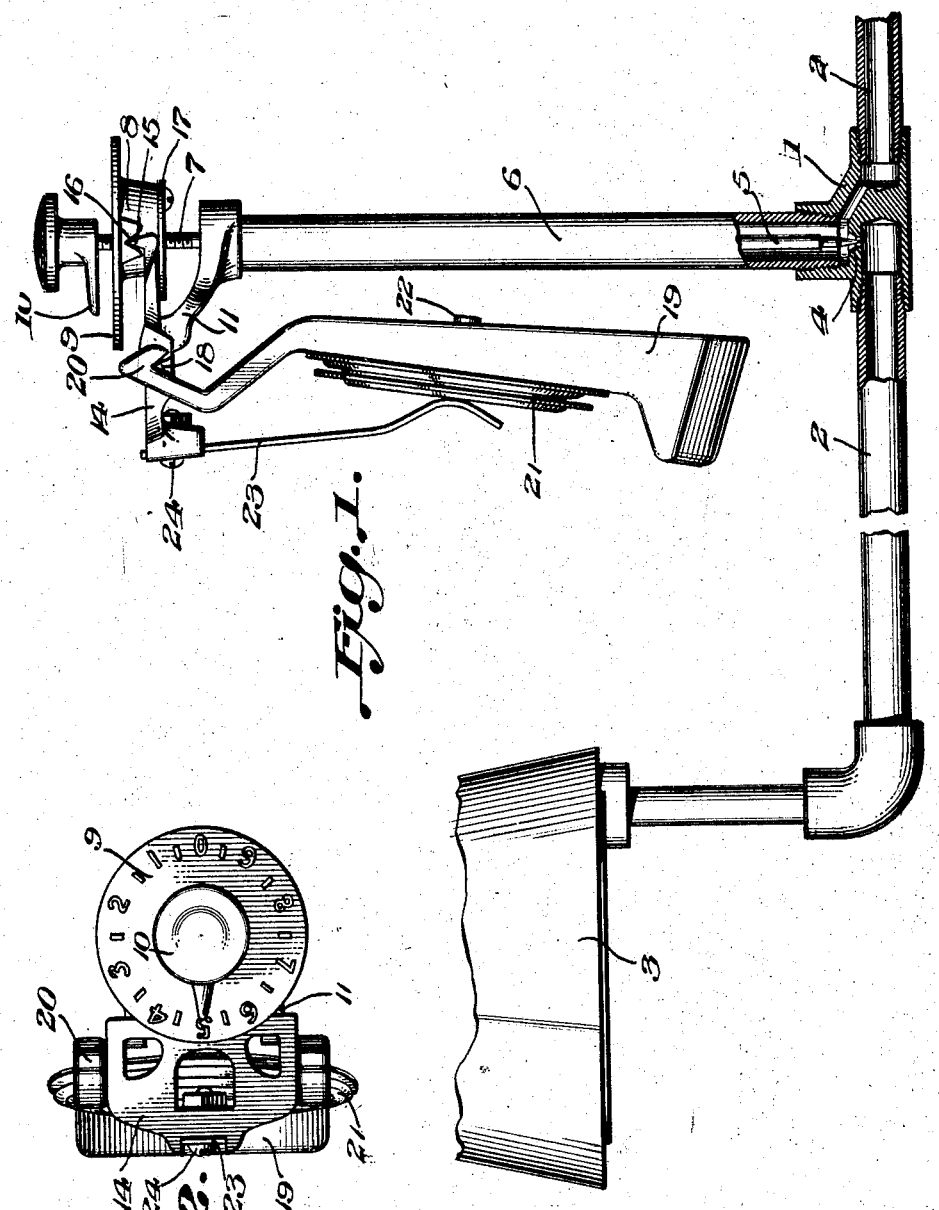
Inventor,
Henry M. Sheer
By Vernon & Hodges his Atty.

Aug. 17, 1926.

H. M. SHEER

THERMOSTATIC SELF REGULATING VALVE

Filed March 16, 1925    2 Sheets-Sheet 2

1,596,771

Inventor;
Henry M. Sheer
By Vernon & Hodges his Atty.

Patented Aug. 17, 1926.

1,596,771

UNITED STATES PATENT OFFICE.

HENRY M. SHEER, OF QUINCY, ILLINOIS.

THERMOSTATIC SELF-REGULATING VALVE.

Application filed March 16, 1925. Serial No. 15,995.

My invention relates to an improvement in thermostatic self regulating valves.

The object of this invention is to provide a valve which will compensate for any variation in the flow of oil from the supply reservoir to the burner, due to the raising or lowering of either. This self regulating valve operates independently of the hand operated valve and the adjustment of the latter can be made without affecting the action of the device.

A further object of my invention is to provide such a self regulating valve with thermostatic means connected therewith for regulating the passage of oil from the supply reservoir to the burner, this regulation being controlled by the temperature surrounding the burner.

The invention consists in providing a needle valve with hand operating means for controlling the same and also providing a rocking arm adjacent to and for operating the needle valve, the rocking arm having a gravity controlled weight suspended therefrom for regulating the flow of oil through the valve when either the burner or supply reservoir is tilted due to a warp in the floor or for any other reason. A wafer thermostat is secured to the weight and has a direct connection to the rocking arm for actuating the latter independently of the gravity controlled weight. The heater is intended to rest level and firmly on the floor and under such normal conditions, the thermostat controls the flow of oil through the valve, but when the heater is tilted, the gravity controlled weight also comes into action and further controls the flow of oil through the valve so as to prevent flooding of the burner or to supply sufficient oil thereto to maintain a constant temperature within the enclosure.

In the accompanying drawings:

Fig. 1 is a side elevation of my invention with parts broken away.

Fig. 2 is a top plan view of the control mechanism.

Figure 3:
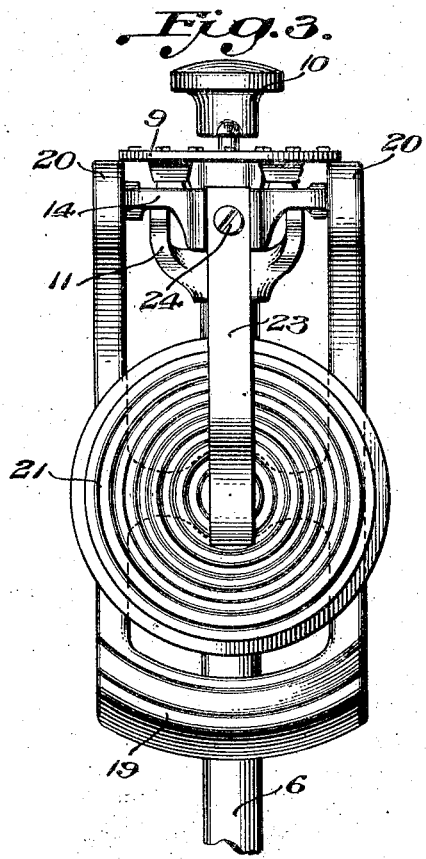
Fig. 3 is a side elevation thereof.
Figure 4:
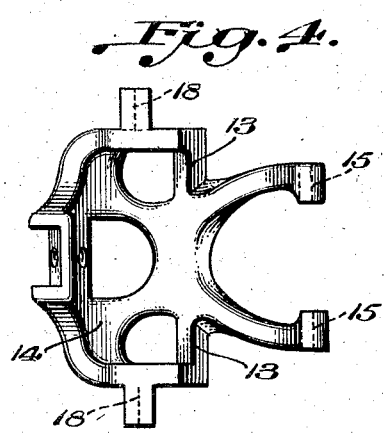
Fig. 4 is a bottom plan view of the rocking arm.
Figure 5:
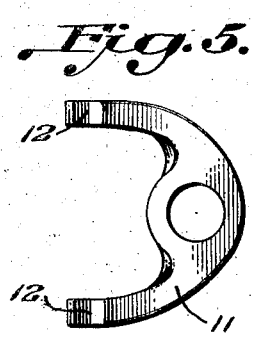
Fig. 5 is a top plan view of the supporting bracket.
Figure 6:
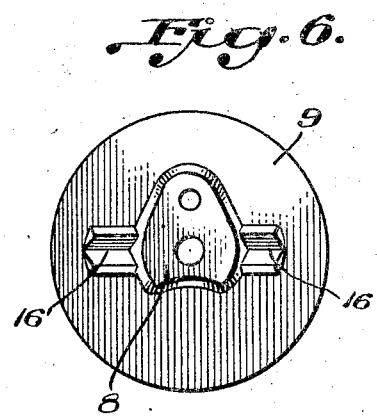
Fig. 6 is a bottom plan view of the regulating dial.
Figure 7:
Fig. 7 is a detail transverse sectional view through the dial and rocking arm.

The numeral 1 indicates the valve casing interposed between the sections 2 of the supply pipe for supplying oil to the oil burner 3. The valve casing 1 is provided with a valve seat 4 for receiving the needle valve 5 extending vertically through an upright pipe 6 screwed into the valve casing 1. The screw-threaded upper end 7 of the needle valve 5 is screwed through the hub 8 of the dial 9 and pointer 10 is fixed to the threaded end of the valve. This constitutes the normal hand operating means for regulating the flow of oil through the supply pipe 2 and valve casing 1 to the burner 3.

Figure 8:
Fig. 8 is a detail sectional view through the rocking arm.

A supporting bracket 11 is secured to the upper end of the pipe 6 and is provided with bearing recesses 12 for receiving knife bearings 13 of the rocking arm 14, as clearly shown in Fig. 8. The forked inner end of the rocking arm 14 is provided with knife bearings 15 to be seated in bearing recesses 16, on the lower surface of the dial 9. A washer 17 is secured to the lower portion of the hub 8 for holding the knife bearings 15 in the recesses 16 and for preventing these parts from being accidently knocked out of their normal position. Knife bearings 18 extend outwardly from each side of the rocking arm 14 and a gravity controlled weight 19 is suspended from these bearings 18 by means of the hooked upper ends 20.

A wafer thermostat 21 is provided with a hub 22, which is received in an opening in the weight 19. A spring 23 normally bears against the outer face of the thermostat 21 and has its upper end secured by a bolt 24, or some similar means, to the outer projecting end of the rocking arm 14.

The normal condition of the flame in the burner 3 is controlled through the hand regulating pointer 10, moving the needle valve 5 to open or close the size of the opening 4. Under such conditions, the supply reservoir, not shown, and the burner 3 with the valve operating mechanism are adapted to rest firmly and level on the floor and in this position, the adjustment of the flame may be fully made by operating the needle valve 5. But, when the temperature of the air begins to increase to an appreciable extent, the wafer thermostat 21 begins to operate, moving the spring 23 outwardly and rocking the rocking arm 14 on its knife bearings 13 for lowering the needle valve 5 and partly closing the valve seat 4 to limit the flow of oil through the valve chamber to the burner. Conversely, as the temperature decreases, the thermostat 21 will contract and permit the weight 19 to draw the outer end of the rocker arm 14 downward for opening the valve seat 4, for permitting an increased stream of oil to flow to the burner 3. The weight 19 is sufficiently heavy so as not to be materially affected by a movement of the thermostat 21.

These burners are often used in buildings where the floors are loose or where they may warp from moisture, thus tilting either the oil container or the burner, and as a result, either an increased or decreased supply of oil is permitted to flow to the burner. As the oil container is raised, under such conditions, the angle of the pipe 6 is changed causing the weight 19 to swing away from the pipe 6 and exert a lesser downward pull of the rocker arm 14 due to a change in the center of gravity of the weight 19 to partly close the valve to take care of the increased oil. If the burner should be raised, the oil pressure in the supply pipes 2 is reduced and by the weight 19 swinging toward the pipe 6, an increased downward pressure is exerted from the outer end of the rocking arm 14, to open the valve and allow more oil to flow to the burner. The weight 19 is gravity actuated and opens or closes the valve seat 4 in direct proportion to the amount of tilting of either the burner or the supply reservoir, so that a sufficiently regulated pressure is maintained on the oil flowing to the burner. The gravity actuated weight 19 and the thermostat 21 are so connected that they will actuate the rocking arm 14 either entirely independent of each other or both together, so as to doubly regulate the valve. By placing the thermostat 21 on the weight 19, a double action is produced for opening or closing the needle valve 5. A constant and uniform tension against the thermostat is produced and maintained by the weight 19 and the tension is changed only after the needle valve is fully seated.

It will be noted that my invention controls the flow of oil to the burner in accordance with the temperature and also in accordance with the increased or decreased relative position of the oil supply reservoir, thus providing an absolutely safe control for the burner. This practically eliminates occurrence of fires, in cheaply constructed wooden floor brooder houses.

I claim:

1. A device of the character described including a valve, a rocking arm connected therewith, gravity actuated means for moving said rocking arm to control said valve, and thermostatic means connected with said rocking arm for actuating the valve independently of or together with the gravity actuated means.

2. A device of the character described including a supply pipe, a needle valve, gravity actuating means for regulating the position of the valve upon any variation of the relative positions of the supply reservoir and burner, and thermostatic means connected with the gravity actuating means for regulating the valve.

3. A device of the character described including a valve seat, a needle valve, a rocking arm for controlling the needle valve, a gravity controlled actuating means connecting with the rocking arm, and a thermostat for actuating the rocking arm and controlling the needle valve independently of the gravity controlled actuating means.

4. A device of the character described including a valve seat, a needle valve for closing the valve seat, a rocking arm connected with and for actuating the needle valve, a gravity controlled weight suspended from the rocking arm for moving the needle valve upon the variation in the position of the weight, and thermostatic means connected with the weight for actuating the rocking arm and controlling the needle valve independently of the gravity controlled weight.

5. A device of the character described including a supply pipe, a valve chamber in said supply pipe and having a valve seat therein, an upright pipe connected with the valve chamber and a needle valve extending through the upright pipe, hand operating means connected with the upper end of the needle valve, a bracket secured to the upright pipe, a rocking arm pivotally supported on the bracket and having a knife bearing connection with the hand operating means, a gravity controlled weight suspending from the rocking arm for moving said rocking arm and needle valve upon any variation in the position of the supply pipe, a spring connected with the outer end of the rocking arm and depending therefrom, and a thermostat connected with the weight and normally bearing against the spring for actuating the rocking arm and controlling the position of the needle valve.

6. A device of the character described including a valve, gravity controlled means for actuating said valve, and thermostatic means for actuating said valve independently of or together with said gravity controlled means.

7. A device of the character described including a valve, gravity controlled means for actuating said valve upon variations in the vertical position thereof, and thermostatic means for actuating said valve independently of or together with said gravity controlled means upon temperature variations adjacent said valve.

8. A device of the character described including a valve, a rocking arm for actuating said valve, gravity controlled means for moving said rocking arm, and thermostatic means for actuating said rocking arm independently of or together with said gravity controlled means.

9. A device of the character described including a valve, a rocking arm for actuating said valve, gravity controlled means for moving said rocking arm, thermostatic means connected with said gravity controlled means, and means connecting said thermostatic means with said rocking arm for actuating said rocking arm independently of or together with said gravity controlled means.

10. A device of the character described including a valve, a support, a rocking arm pivotally mounted upon said support for regulating said valve, said rocking arm having laterally projecting fingers thereon, and gravity controlled means suspended from said fingers for moving said rocking arm.

11. A device of the character described including a valve, a rocking arm for moving said valve, gravity actuated means for moving said rocking arm to control said valve, and thermostatic means connected with said rocking arm for actuating the valve independently of the gravity actuated means.

12. A device of the character described including a valve, gravity actuated means for regulating the position of the valve, and thermostatic means carried by the gravity actuated means for regulating the valve independently of or together with the gravity actuated means.

13. A device of the character described including a valve, a rocking arm connected therewith, a weight suspended from said rocking arm, and a thermostat carried by said weight and connected with the rocking arm for actuating said arm and valve.

14. A device of the character described including a valve, a rocking arm for moving the valve, means for supporting said rocking arm, a thermostat, and a leaf spring connected with the outer end of the rocking arm and extending into engagement with and bearing against the thermostat for transmitting a movement of the thermostat to the rocking arm and valve.

15. A device of the character described including a valve, a rocking arm for moving the valve, a thermostat suspended from the rocking arm, and means associated with the thermostat for causing a rocking of the arm upon substantial temperature variations at the thermostat.

In testimony whereof I affix my signature.

HENRY M. SHEER.